Patented Sept. 14, 1954

2,689,257

UNITED STATES PATENT OFFICE 2,689,257

CAMPHORYLSULFONIC ACID ESTERS OF HYDROXY SUBSTITUTED NAPHTHALENES

Quentin E. Thompson, Belleville, Ill., assignor to Monsanto Chemical Company, St. Louis, Mo., a corporation of Delaware No Drawing. Application November 7, 1952, Serial No. 319,409

12 Claims. (Cl. 260—456)

This invention relates to new and useful camphorylsulfonic acid esters of hydroxy substituted naphthalenes. More specifically this invention relates to camphorylsulfonic acid esters of 1 - hydroxy-2-alkoxy-4-keto-4a-methyl-1,4,- 4a,5,8,8a-hexahydronaphthalenes, which ketoesters may be represented by the structural formula

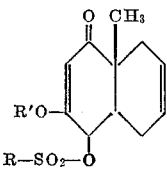

where R is a camphoryl radical, and where R' is a short chain alkyl radical such as methyl, ethyl, propyl, butyl, amyl, etc.

The new keto-esters of this invention are chiefly high melting solids and are useful as plasticizers of cellulose nitrate.

The trans isomers of the new keto-esters are particularly useful in the preparation of "transbicyclic ketones," i. e. compounds of the structural formula

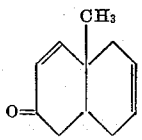

(trans-2-keto-4a-methyl-1,2,4a,5,8,8a-hexahydronaphthalene)

which "trans-bicyclic ketones" are important intermediates in the total synthesis of steroids having cortisone-like activity (J. A. C. S., vol. 74, p. 4223ff, September, 1952). For example, by reacting a trans-isomer of a keto-ester of this invention with an excess of an equimolecular amount of lithium aluminum hydride (LiAlH₄) in an ether solvent therefor, followed by sulfuric acid hydrolysis, good yields of the corresponding "trans-bicyclic ketone" are obtained.

The new keto-esters upon reductive deacylation with such reducing agents as zinc dust and acetic acid yield 2-alkoxy-4-keto-4a-methyl-1,4,- 4a,5,8,8a-hexahydronaphthalenes, which compounds may be represented by the structural formula

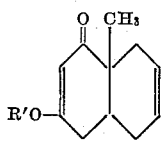

These alkoxy substituted naphthalenes are described and claimed in co-pending application Serial No. 325,703, filed December 12, 1952, of A. J. Speziale.

It will be obvious to those skilled in the art that the fused bicyclic nucleus of the new compounds of this invention contain three optically active carbon atoms. As a result thereof, the new compounds may exist in eight optically active isomeric forms or four racemates. All such forms of the new esters are contemplated as coming within the scope of this invention. It is to be understood that where no notation appears with the name of the ester that the name is to be interpreted in its generic sense, i. e., as representing the individual isomers in separated form as well as the racemic mixtures thereof or the total unresolved mixture of isomers. The name of the ester of itself does not merely represent the unresolved mixture of isomers.

As illustrative of the new compounds and the preparation thereof is the following.

*Example I*

To a suitable reaction vessel containing 20.8 parts by weight (substantially 0.1 mole) of dl-trans-1-hydroxy-4-keto-2-methoxy - 4a - methyl-1,4,4a,5,8,8a-hexahydronaphthalene and approximately 50 parts by weight of pyridine is slowly added with agitation 23.2 parts by weight (substantially 0.1 mole) of d-camphor-10-sulfonyl chloride. While maintaining the temperature below 50° C. the mix is agitated for about 2 hours. The mushy reaction mixture is then poured into 250 parts by weight of an ice cold 3 molar hydrochloric acid solution and the cooled mix so obtained filtered. Approximately 37.4 parts by weight of a white crystalline solid identified as dl-trans-1-(d-camphor-10-sulfonyloxy) - 4-keto-2-methoxy-4a-methyl-1,4,4a,5,8,8a - hexahydronaphthalene possessing a melting point of 135–140° C. is obtained. Fractional recrystallization of the diastereoisomeric mixture from benzene gives the more insoluble l-trans-1-(d-camphor - 10 - sulfonyloxy)-4-keto-2-methoxy - 4a-methyl - 1,4,4a,5,8,8a - hexahydronaphthalene, melting point 166–167° C. The more soluble dextro rotating diastereoisomer, namely d-trans-1-(d-camphor-10-sulfonyloxy)-4-keto-2-methoxy-4a-methyl-1,4,4a,5,8,8a - hexahydronaphthalene is obtained by concentrating the mother liquors followed by recrystallization. This ester possesses a melting point of 174–175° C.

Example II

Employing the procedure of Example I but replacing $d$-camphor-10-sulfonyl chloride with an equimolecular amount of $l$-camphor-10-sulfonyl chloride substantially white crystalline $dl$-trans-1-($l$-camphor-10-sulfonyloxy)-4-keto-2-methoxy-4a-methyl-1,4,4a,5,8,8a-hexahydronaphthalene is obtained in an excellent yield. Fractional recrystallization of the diastereoisomeric mixture from acetone gives the more insoluble dextro rotating diastereoisomer which possesses a melting point of 166–167° C. By concentrating the mother liquors and recrystallizing the more soluble levo isomer is obtained. It possesses a melting point of 174–175° C.

Example III

In accordance with the procedure of Example I an excellent yield of $dl$-trans-1-(3-bromo-$d$-camphor-10-sulfonyloxy)-4-keto-2-methoxy-4a-methyl-1,4,4a,5,8,8a-hexahydronaphthalene is obtained employing the following reactants Parts by weight
$dl$-Trans-1-hydroxy-4-keto-2-methoxy-4a-methyl-1,4,4a,5,8,8a-hexahydronaphthalene _____ 20.8
Diastereoisomeric 3-bromo-$d$-camphor-10-sulfonyl chlorides _____ 33.0
Pyridine _____ 50.0

Example IV

In accordance with the procedure of Example I an excellent yield of $dl$-trans-($d$-camphor-10-sulfonyloxy)-4-keto-2-n-butoxy-4a-methyl-1,4,4a,5,8,8a-hexahydronaphthalene is obtained employing the following reactants Parts by weight
$dl$-Trans-1-hydroxy-4-keto-2-n-butoxy-4a-methyl-1,4,4a,5,8,8a-hexahydronaphthalene _____ 25.0
$d$-Camphor-10-sulfonyl chloride _____ 23.2
Pyridine _____ 50.0

Example V

In accordance with the procedure of Example I an excellent yield of $dl$-trans-1-($d$-camphor-10-sulfonyloxy)-4-keto-2-ethoxy-4a-methyl-1,4,4a,5,8,8a-hexahydronaphthalene is obtained employing the following reactants Parts by weight
$dl$-Trans-1-hydroxy-4-keto-2-ethoxy-4a-methyl-1,4,4a,5,8,8a-hexahydronaphthalene _____ 22.0
$d$-Camphor-10-sulfonyl chloride _____ 23.2
Pyridine _____ 50.0

Example VI

In accordance with the procedure of Example I an excellent yield of white solid 1-($d$-camphor-10-sulfonyloxy)-4-keto-2-methoxy-4a-methyl-1,4,4a,5,8,8a-hexahydronaphthalene is obtained employing the following reactants Parts by weight
1-hydroxy-4-keto-2-methoxy-4a-methyl-1,4,4a,5,8,8a-hexahydronaphthalene _____ 21.0
$d$-Camphor-10-sulfonyl chloride _____ 23.2
Pyridine _____ 50.0

Example VII

In accordance with the procedure of Example I an excellent yield of $dl$-trans-1-(d-camphor-10-sulfonyloxy)-4-keto-2-n-propoxy-4a-methyl-1,4,4a,5,8,8a-hexahydronaphthalene is obtained employing the following reactants Parts by weight
$dl$-Trans-1-hydroxy-4-keto-2-n-propoxy-4a-methyl-1,4,4a,5,8,8a-hexahydronaphthalene _____ 23.6
$d$-Camphor-10-sulfonyl chloride _____ 23.2
Pyridine _____ 50.0

Example VIII

In accordance with the procedure of Example I an excellent yield of $dl$-cis-1-(3-bromo-$d$-camphor-10-sulfonyloxy)-4-keto-2-methoxy-4a-methyl-1,4,4a,5,8,8a-hexahydronaphthalene is obtained employing the following reactants Parts by weight
$dl$-Cis-1-hydroxy-4-keto-2-methoxy-4a-methyl-1,4,4a,5,8,8a-hexahydronaphthalene _____ 20.6
Diastereoisomeric 3-bromo-$d$-camphor-10-sulfonyl chlorides _____ 33.0
Pyridine _____ 50.0

In addition to the esters prepared in the preceding examples, the following examples are further illustrations of compounds coming within the scope of this invention:

1-(camphor-10-sulfonyloxy)-4-keto-2-n-pentoxy-4a-methyl-1,4,4a,5,8,8a-hexahydronaphthalene 1-(camphor-$\pi$-sulfonyloxy)-4-keto-2-methoxy-4a-methyl-1,4,4a,5,8,8a-hexahydronaphthalene 1-(3-bromo-$l$-camphor-10-sulfonyloxy)-4-keto-2-methoxy-4a-methyl-1,4,4a,5,8,8a-hexahydronaphthalene 1-(3-chloro-$d$-camphor-10-sulfonyloxy)-4-keto-2-methoxy-4a-methyl-1,4,4a,5,8,8a-hexahydronaphthalene 1-(3-bromo-camphor-$\pi$-sulfonyloxy)-4-keto-2-methoxy-4a-methyl-1,4,4a,5,8,8a-hexahydronaphthalene 1-(3-chloro-camphor-$\pi$-sulfonyloxy)-4-keto-2-methoxy-4a-methyl-1,4,4a,5,8,8a-hexahydronaphthalene 1-(camphor-3-sulfonyloxy)-4-keto-2-methoxy-4a-methyl-1,4,4a,5,8,8a-hexahydronaphthalene The keto-alcohol reactants employed in the preparation of the new keto-esters are readily prepared by partially reducing the corresponding 1,4-diketo compound, as for example by reacting a mixture comprising zinc dust, acetic acid and a 1,4-diketo compound of the structural formula

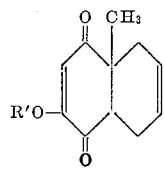

(2-alkoxy-1,4-diketo-4a-methyl-1,4,4a,5,8,8a-hexahydronaphthalene)

where R' has the same significance as aforedescribed. Such 1,4-diketo compounds are well known chemical compounds and many of them are important intermediates in the total synthesis of steroids having cortisone-like activity (J. A. C. S., Vol. 74, p. 4223ff, September, 1952).

Although the preceding examples have described certain specific embodiments of this invention both as to the nature of the novel esters and their method of preparation, it is to be understood that substantial variations obvious to those skilled in the art in the reactants and reaction conditions set forth above, e. g. while temperatures of from about 40° C. to about 60° C. are preferred, reaction temperatures of about −10° C. to reflux temperatures may be used, and while substantially equimolar proportions of the respective sulfonyl halide and hydroxy naphthalene reactants are preferred from 0–25% molar excess sulfonyl halide reactant may be employed when desirable, etc., may be made without departing from the spirit or scope of this invention.

What is claimed is:

1. As new compounds esters of the structural formula

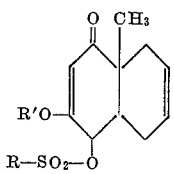

where R is a camphoryl radical and where R' is a short chain alkyl radical.

2. As new compounds esters of the structural formula

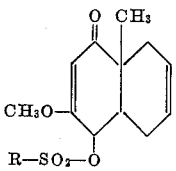

where R is a 10-camphoryl radical.

3. The trans isomers of the esters of claim 2.

4. As new compounds esters of the structural formula

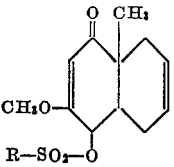

where R is the camphoryl radical.

5. 1-(d-camphor-10-sulfonyloxy) - 4 - keto-2-methoxy - 4a - methyl - 1,4,4a,5,8,8a - hexahydronaphthalene.

6. dl-Trans-1-(d-camphor-10-sulfonyloxy)-4-keto-2-methoxy-4a-methyl-1,4,4a,5,8,8a-hexahydronaphthalene.

7. dl-Trans-1-(l-camphor - 10 - sulfonyloxy)-4 - keto - 2 - methoxy - 4a - methyl - 1,4,4a,5,8,8a-hexahydronaphthalene.

8. l-Trans-1-(d-camphor - 10 - sulfonyloxy)-4-keto - 2 - methoxy - 4a - methyl - 1,4,4a,5,8,8a-hexahydronaphthalene.

9. d-Trans-1-(d-camphor -10- sulfonyloxy)-4-keto-2-methoxy-4a-methyl-1,4,4a,5,8,8a-hexahydronaphthalene.

10. The process of making the esters of claim 2 which comprises reacting a keto-alcohol of the formula

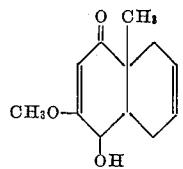

and a camphoryl-10-sulfonyl chloride in pyridine.

11. The process of making the esters of claim 4 which comprises reacting 1-hydroxy-4-keto-2-methoxy -4a- methyl - 1,4,4a,5,8,8a - hexahydronaphthalene and camphoryl sulfonyl chloride in pyridine.

12. The process of making the ester of claim 6 which comprises reacting dl-trans-1-hydroxy-4-keto-2-methoxy-4a-methyl-1,4,4a,5,8,8a-hexahydronaphthalene and d-camphor-10-sulfonyl chloride in pyridine.

References Cited in the file of this patent

UNITED STATES PATENTS

| Number | Name | Date |
|---|---|---|
| 2,373,298 | Dougherty et al. | Apr. 10, 1945 |